C. W. SALADEE.
SLIDING-BOLTS FOR WINDOW-SASH, &c.
No. 173,181. Patented Feb. 8, 1876.
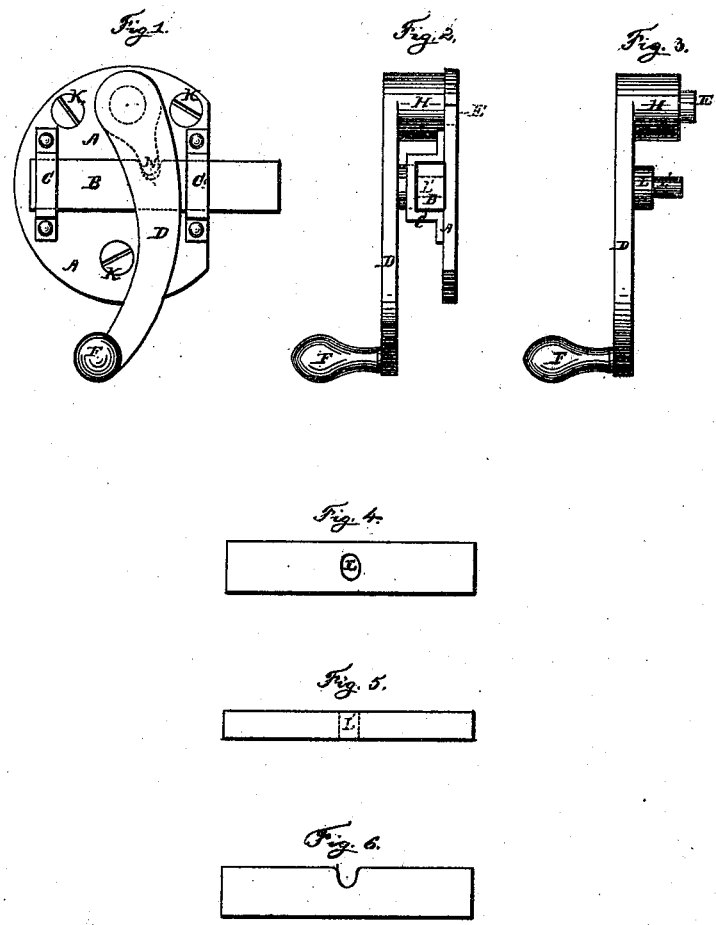
WITNESSES: INVENTOR:

UNITED STATES PATENT OFFICE

CYRUS W. SALADEE, OF WASHINGTON, DISTRICT OF COLUMBIA.

IMPROVEMENT IN SLIDING BOLTS FOR WINDOW-SASHES, &c.

Specification forming part of Letters Patent No. 173,181, dated February 8, 1876; application filed December 13, 1875.

*To all whom it may concern:*

Be it known that I, CYRUS W. SALADEE, of Washington, in the District of Columbia, have invented a new and useful Improvement in Sliding Bolts, of which the following is a specification:

My object is to produce a neat and durable sliding-bolt fastening, applicable to window-sash and general purposes, where a bolt of any description can be used; the design being to so arrange the bolt and its operating-lever upon the outer face of a base-plate as to render its construction convenient and cheap, and bring all the parts in front upon the plate, so that the latter can be applied without requiring any special adaptation to render it convenient to operate the lever. To this end the lever or crank is provided with a boss-extension, which, while forming a broad bearing upon the plate, serves to bring the lever out therefrom, to allow it to pass over the bolt to bring it in front.

A sliding bolt operated by a swinging lever I am aware is not new; but in such device both the bolt and the lever have been arranged within a case, and are not so well adapted for general use as my plan, which presents the arrangement for operation upon the outer face of the plate, and requires only the attachment of the plate to render it complete and applicable for general use.

In the accompanying drawings, Figure 1 represents a face view of a sliding-bolt fastening embracing my invention; Fig. 2, an edge view of the same; Fig. 3, an edge view of the lever with its boss-bearing extension; and Figs. 4, 5, and 6, the bolt.

Upon the outer side of the face-plate A I arrange the sliding bolt B, its guide-loops C, and the lever or crank D, for operating the bolt. To bring the lever over the front side of the bolt, and form a broad solid bearing therefor, it is provided with an extension-boss, H, which forms a seat bearing upon the plate, and brings the lever or crank out so as to allow it to extend over the bolt, to which it is connected by a pin, L L', as shown in Fig. 3; or this connection may be made by a shorter lever or tongue, N, formed upon the boss-extension H, beneath the lever or crank D, as shown in Fig. 1, in which case both the thumb-lever and the bolt-lever project from the same boss-bearing.

The lever or crank has a knob-handle, F, and is operated to move the bolt in and out of the fastening-socket.

I claim—

The swinging lever or crank D, having the pivotal boss-bearing H, and suitably connected to the sliding bolt B, at a point between the fulcrum and the crank-handle, together with the guide-loops C C', all arranged upon the outer surface of the base-plate A, in the manner and for the purpose substantially as shown and described.

CYRUS W. SALADEE.

Witnesses:
 HERM. LAUTEN,
 ABBY C. SALADEE.